US012539247B1

(12) United States Patent
Zhao et al.

(10) Patent No.: US 12,539,247 B1
(45) Date of Patent: Feb. 3, 2026

(54) DOUBLE-CLAW DRIVING MECHANISM

(71) Applicants: Dongguan Rijie Electronic Technology Co., Ltd., Guangdong (CN); Shenzhen Envision Technology Innovation Co., Ltd., Guangdong (CN)

(72) Inventors: Quan Zhao, Dongguan (CN); Lang Cun, Guangdong (CN)

(73) Assignees: DONGGUAN RIJIE ELECTRONIC TECHNOLOGY CO., LTD., Guangdong (CN); SHENZHEN ENVISION TECHNOLOGY INNOVATION CO., LTD., Guangdong (CN)

( * ) Notice: Subject to any disclaimer, the term of this patent is extended or adjusted under 35 U.S.C. 154(b) by 0 days.

(21) Appl. No.: 18/954,488

(22) Filed: Nov. 20, 2024

(30) Foreign Application Priority Data

Oct. 14, 2024 (CN) ......................... 202422486243.2

(51) Int. Cl.
*A61H 7/00* (2006.01)
*A61H 19/00* (2006.01)
*F16H 37/12* (2006.01)

(52) U.S. Cl.
CPC ............. *A61H 7/007* (2013.01); *A61H 19/30* (2013.01); *F16H 37/122* (2013.01);
(Continued)

(58) Field of Classification Search
CPC ............ A61H 7/007; A61H 2201/0149; A61H 15/0078; A61H 2201/1669; A61H 2205/081; A61H 2201/1623; A61H 2201/1215; A61H 2015/0028; A61H 2201/1654; A61H 23/006; A61H 2201/0138; A61H 2201/1678; A61H 2201/1427; A61H 2201/149; A61H 15/00; A61H 19/34; A61H 2201/1418; A61H 7/004; A61H 23/0254; A61H 2201/1676; A61H 23/0263; A61H 23/02; A61H 19/44; A61H 2015/0014; A61H 7/00; A61H 19/30; A61H 39/04; A61H 2201/1609; A61H 2201/1614; A61H 21/00; A61H 23/00;
(Continued)

(56) References Cited

U.S. PATENT DOCUMENTS 11,007,110 B1 5/2021 Zhou et al.
11,554,073 B1 * 1/2023 Guo ........................ A61H 7/005
2024/0307261 A1 * 9/2024 Wang ..................... A61H 19/44

* cited by examiner

*Primary Examiner* — Christine H Matthews
(74) *Attorney, Agent, or Firm* — Rondaus PLLC; George Liu

(57) ABSTRACT

Disclosed is a double-claw driving mechanism. The double-claw driving mechanism comprises a housing, a driving plate and a driving device; the housing is provided with a horizontal guide groove; the driving plate is arranged in the guide groove, a swing arm is installed at each of two ends of the driving plate, and a lower end of the swing arm is connected to the driving plate; and the driving device is used for driving the driving plate to reciprocate in a length direction of the guide groove, thereby driving the swing arm to swing in a reciprocating manner, and the two swing arms swing between positions close to each other and positions away from each other. When the driving plate moves horizontally in a reciprocating manner, the upper end of the swing arm is limited by the massage head or the amplitude of the swing shaft.

17 Claims, 9 Drawing Sheets

(52) U.S. Cl.
CPC ................ *A61H 2201/1215* (2013.01); *A61H 2201/1418* (2013.01); *A61H 2201/1676* (2013.01)

(58) Field of Classification Search
CPC ........ A61H 7/008; A61H 19/32; A61H 19/50; A61H 2001/0251
See application file for complete search history.

DOUBLE-CLAW DRIVING MECHANISM

TECHNICAL FIELD

The present disclosure relates to the field of massagers, and in particular to a double-claw driving mechanism.

BACKGROUND

Existing massagers generally employ a single cam structure in conjunction with a single massage head, which provides a massage stimulation effect through horizontal or vertical reciprocal movement of the single massage head.

For instance, U.S. Pat. No. 11,007,110B1 utilizes the reciprocal movement of a connecting rod to drive changes in a chamber, thereby achieving stimulation to the human body. However, its stimulation source is relatively gentle and cannot effectively simulate the massage effect of human touch, and the tactile sensation of the single massage head is poor.

Although there are also structures that adopt dual massage heads, they typically use dual motors to achieve the mutual approach or separation of the dual massage heads. Such structures are relatively complex and bulky, making them difficult to install flexibly in existing massagers (e.g., adult products).

SUMMARY

The main objective of the present disclosure is to provide a double-claw driving mechanism aimed at improving the existing double-claw driving structure. By utilizing a single driving device, the relative movement between the two claws can be achieved, thereby enhancing the massage effect. Furthermore, the structure is simple and stable, and the volume is relatively small.

To achieve the above objective, the present disclosure provides a double-claw driving mechanism, comprising:

- a housing, wherein the housing is provided with a horizontal guide groove;
- a driving plate, wherein the driving plate is arranged in the guide groove, a swing arm is installed at each of two ends of the driving plate, and a lower end of the swing arm is connected to the driving plate; and
- a driving device, wherein the driving device is used for driving the driving plate to reciprocate in a length direction of the guide groove, thereby driving the swing arm to swing in a reciprocating manner, and the two swing arms swing between positions close to each other and positions away from each other.

In the actual design, when the driving plate moves horizontally in a reciprocating manner, the upper end of the swing arm is limited by the massage head or the amplitude of the swing shaft. As the driving plate moves horizontally in a reciprocating manner, it drives the lower end of the swing arm to swing, which in turn drives the massage head to swing (i.e., reciprocate), simulating the kneading process of two fingers and thereby enhancing the stimulating effect of the massage. Furthermore, the use of a single driving device achieves the swing movement of the two swing arms, making the overall volume of the massage device smaller and facilitating the application of the double-claw mechanism in adult products (such as female or male sexual products).

DETAILED DESCRIPTION OF THE EMBODIMENTS

Figure 1:
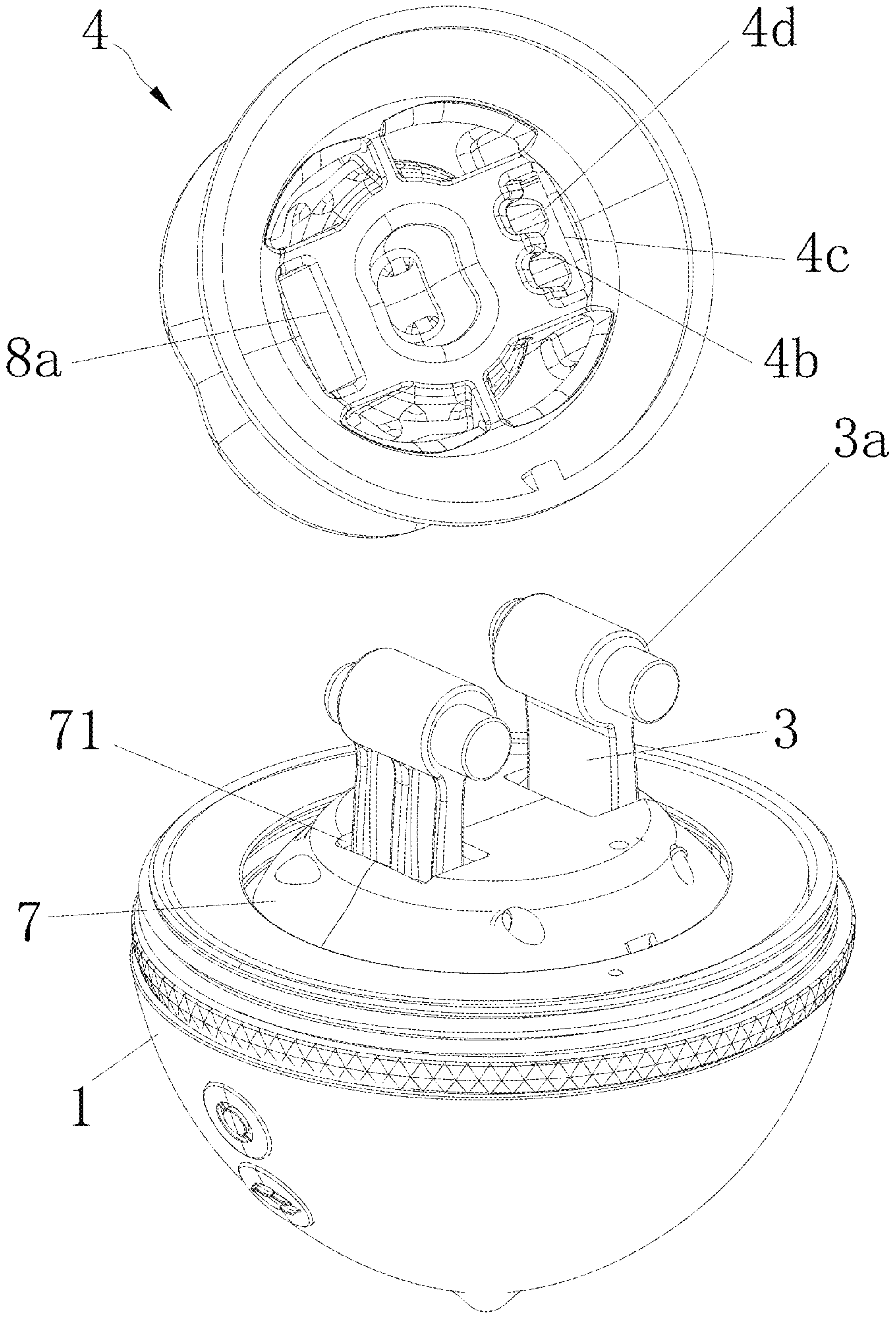
FIG. 1 is a schematic diagram of an elastic skin layer during separation according to the present disclosure.
Figure 2:
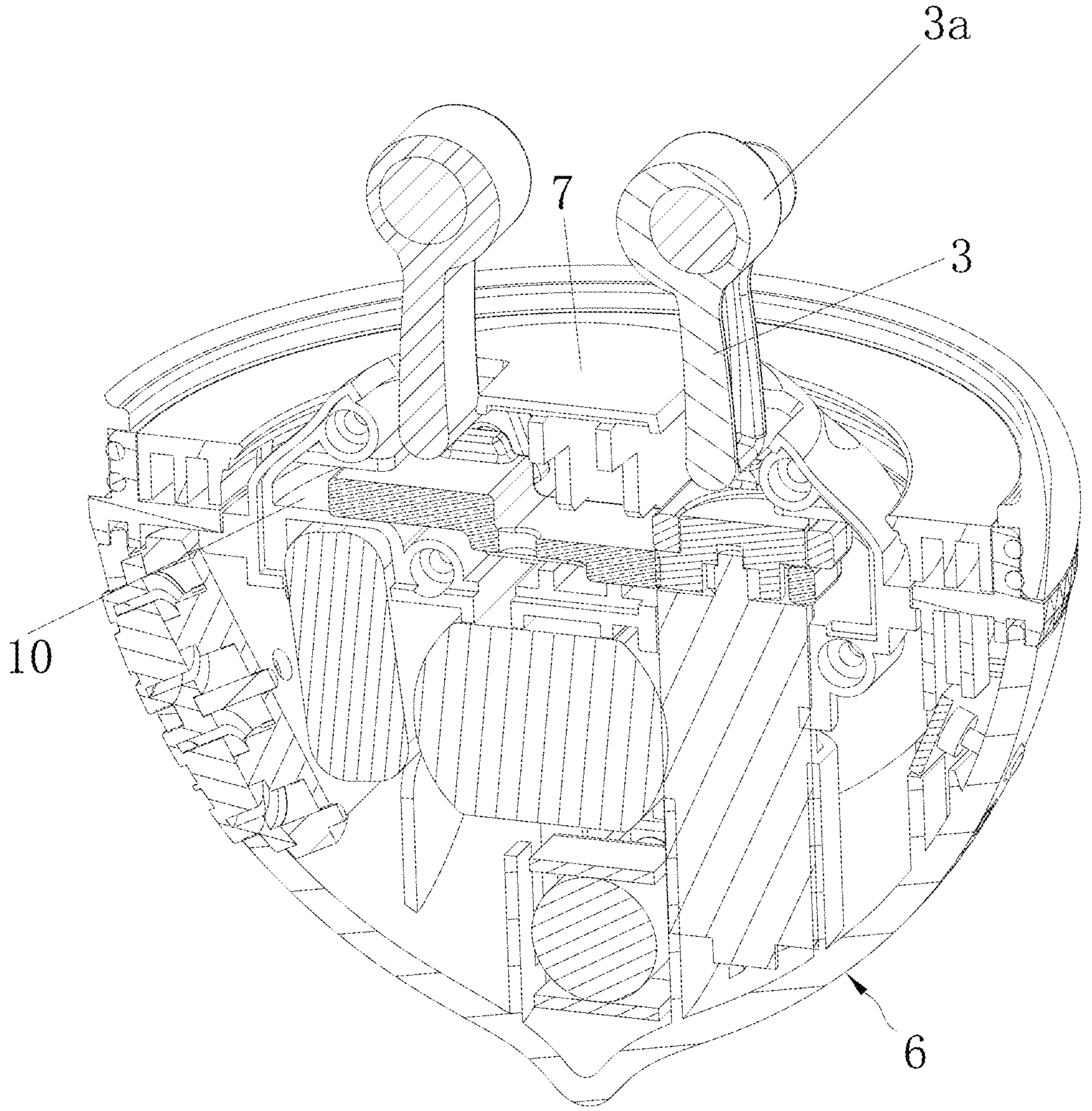
FIG. 2 is a semi-sectional view of the present disclosure.
Figure 3:
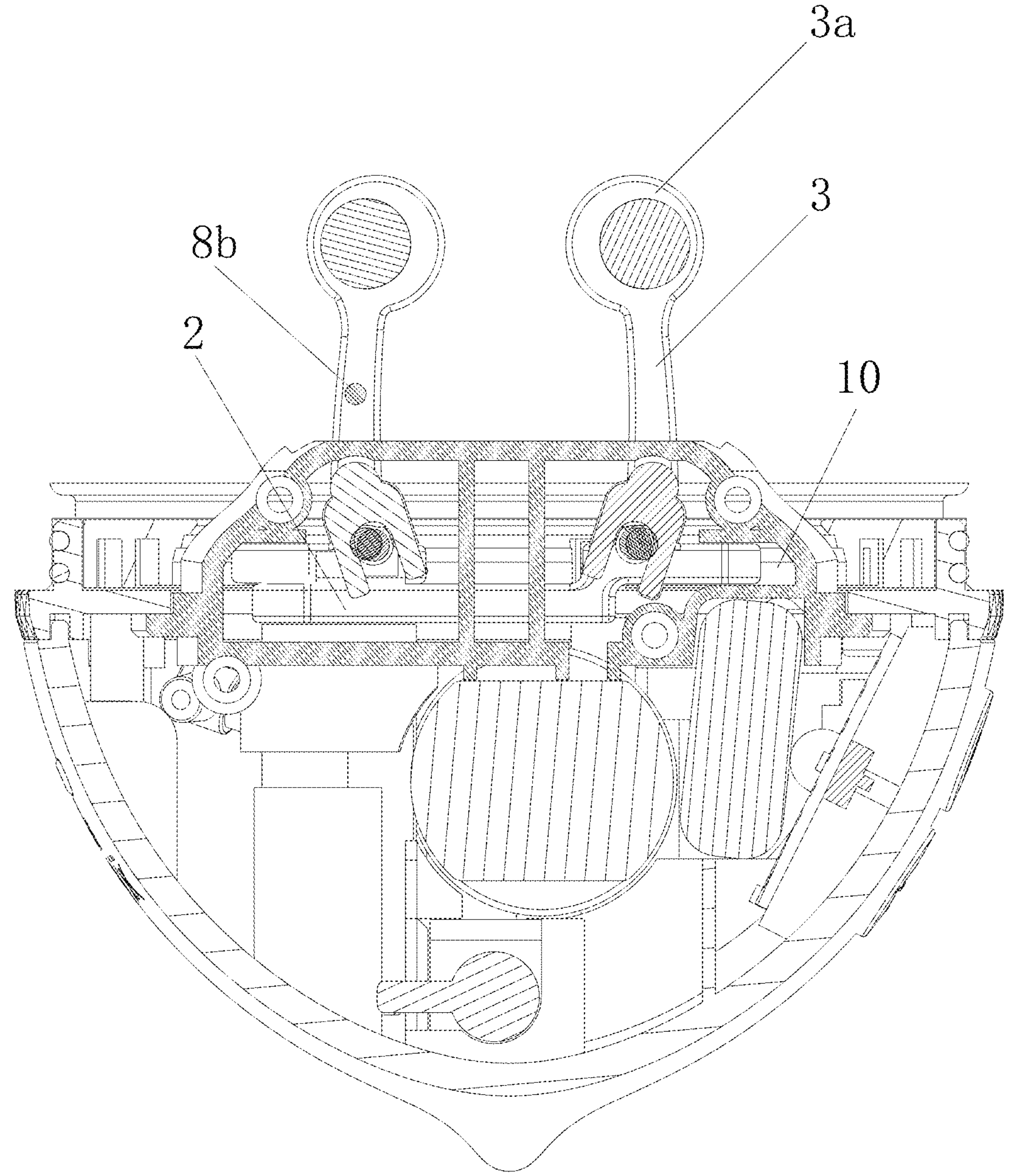
FIG. 3 is a sectional view of the present disclosure.
Figure 4:
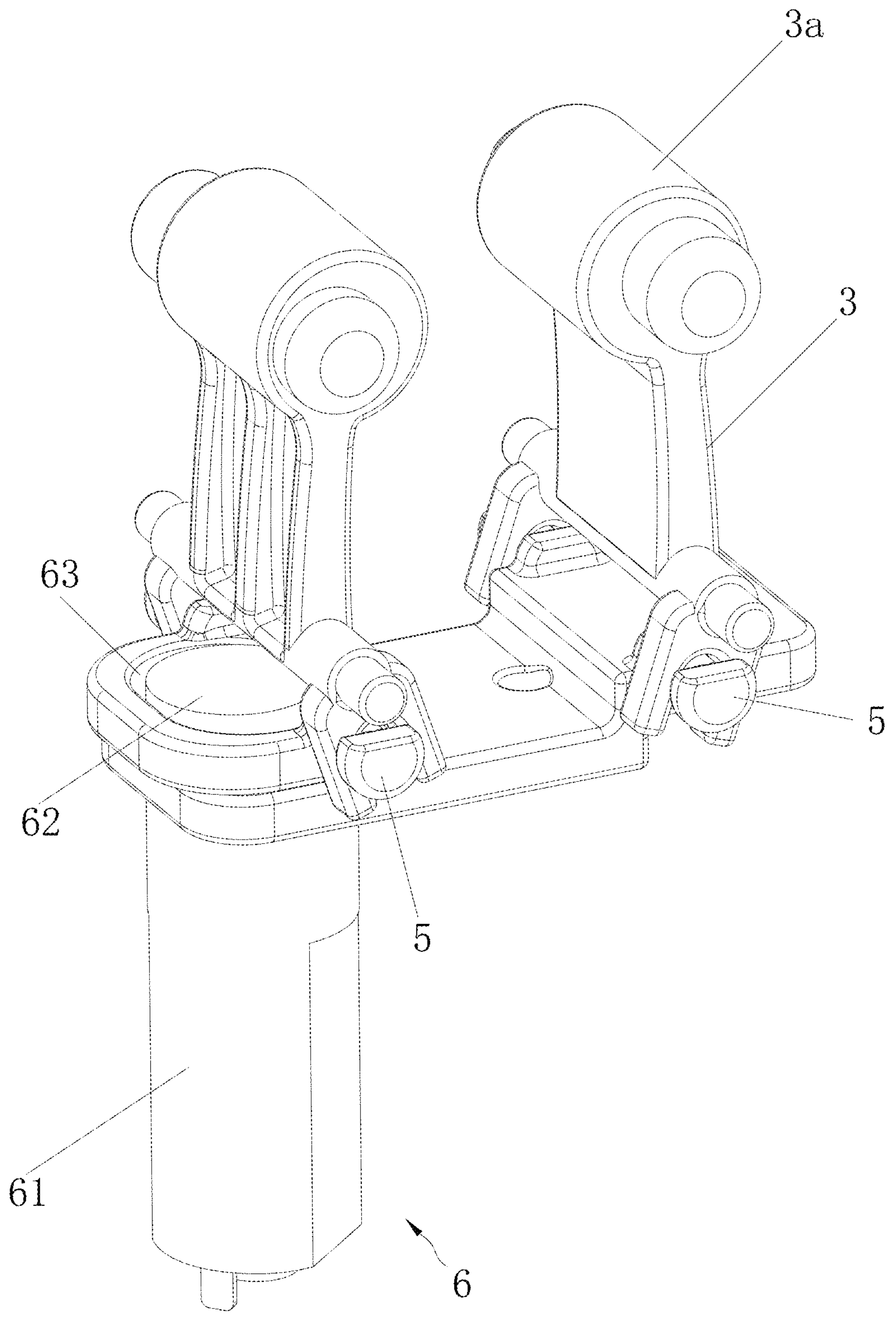
FIG. 4 is a three-dimensional schematic diagram of a driving device.
Figure 5:
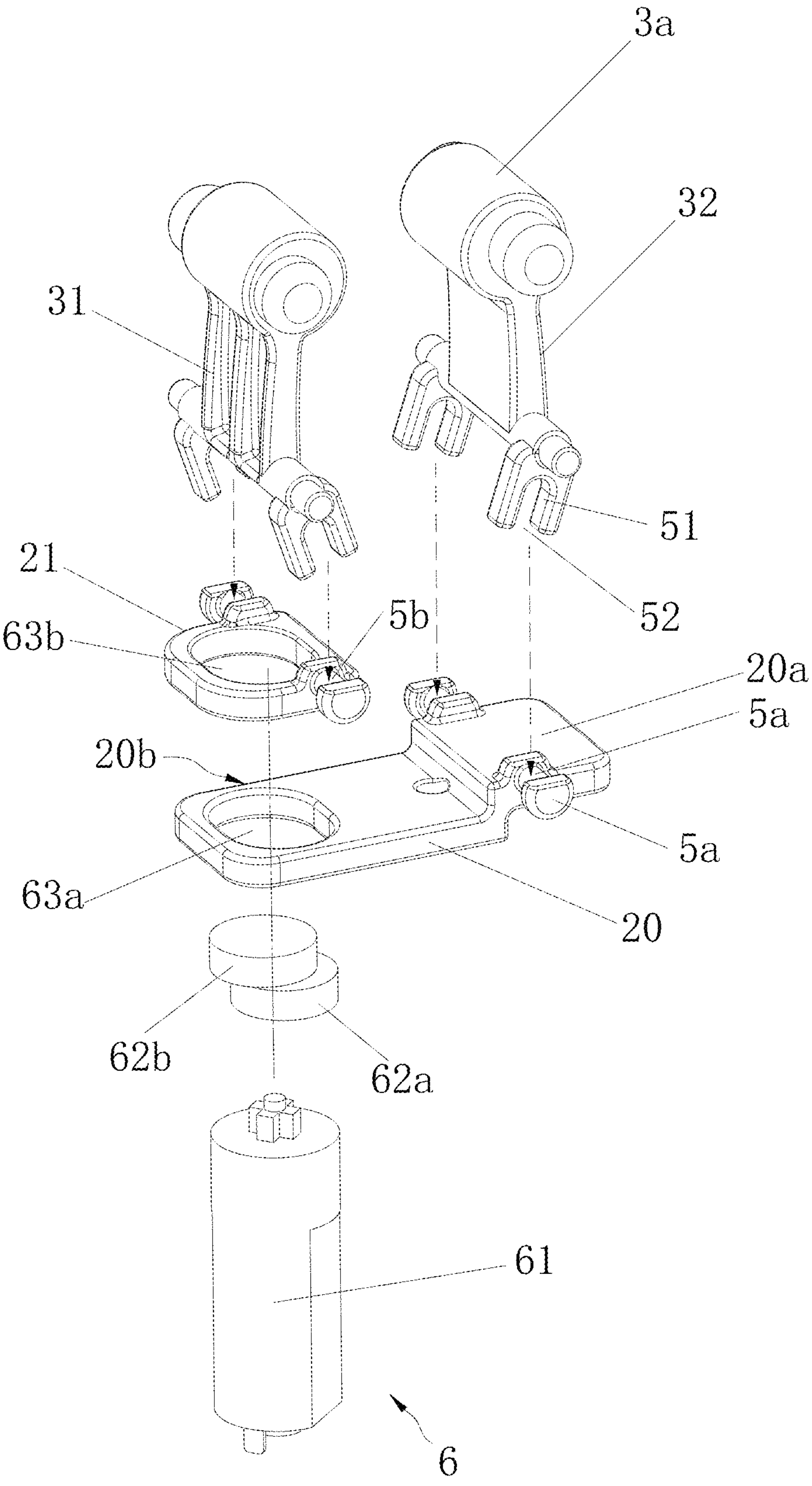
FIG. 5 is an exploded view of a driving device.
Figure 6:
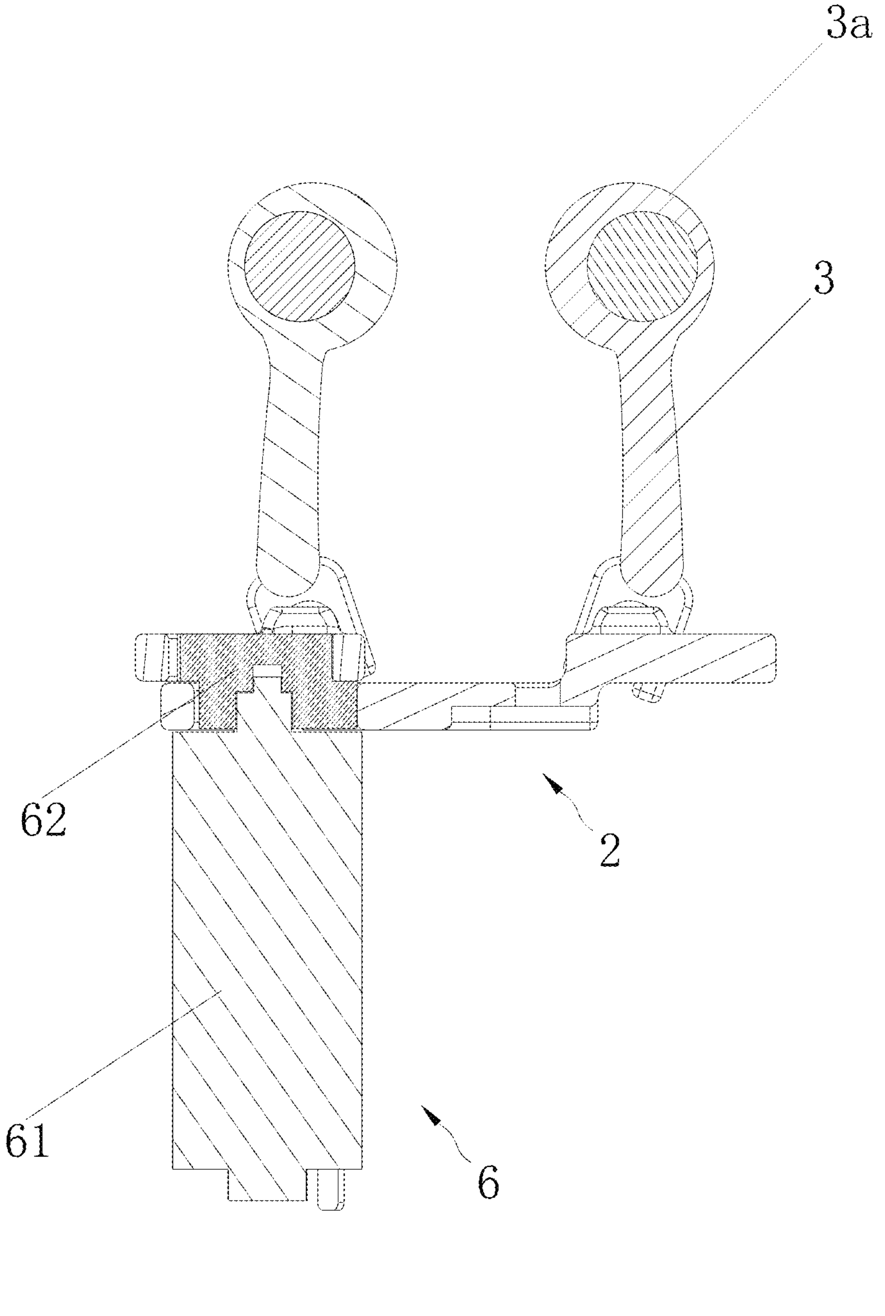
FIG. 6 is a first cross-sectional view of a driving device.
Figure 7:
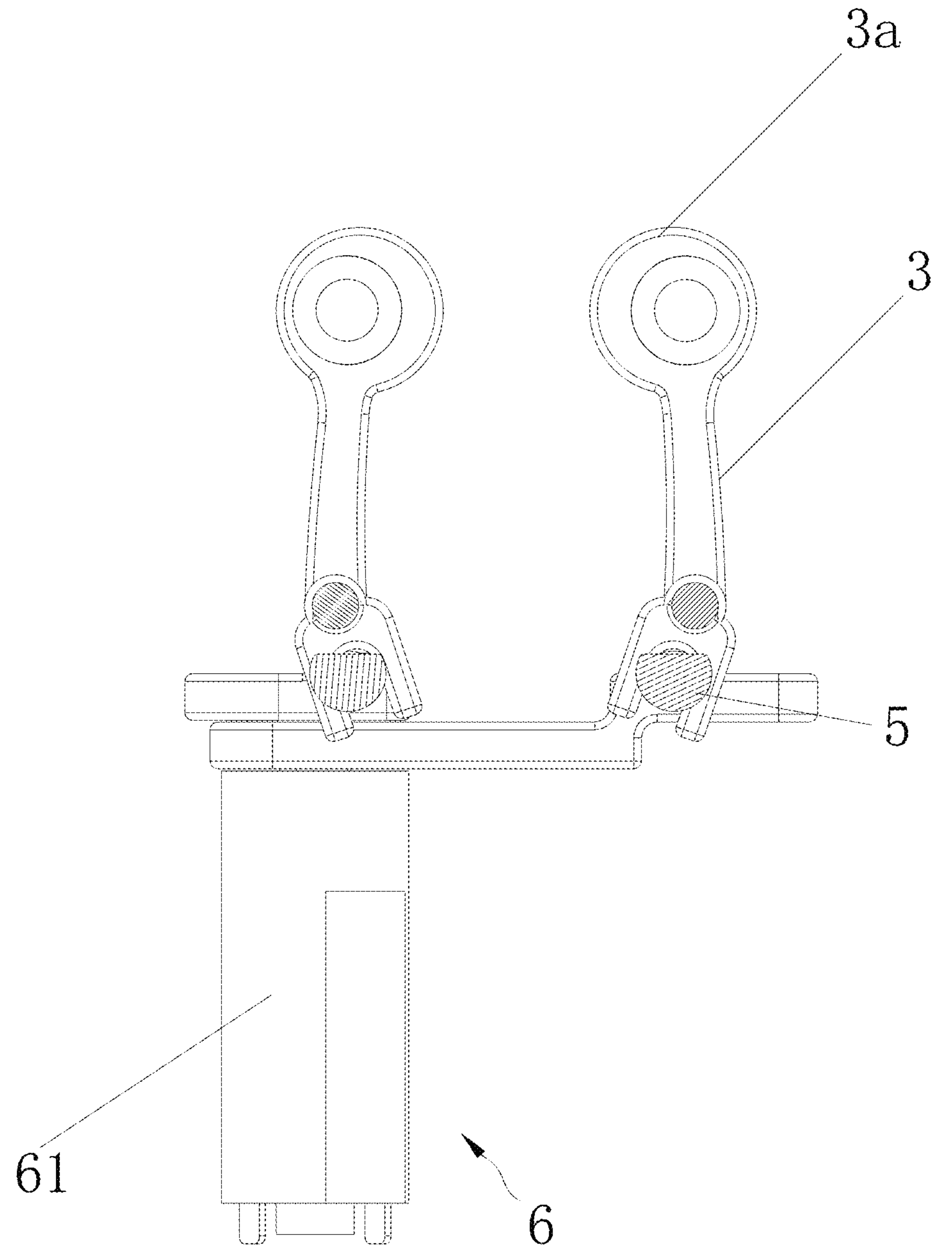
FIG. 7 is a second cross-sectional view of a driving device.
Figure 8:
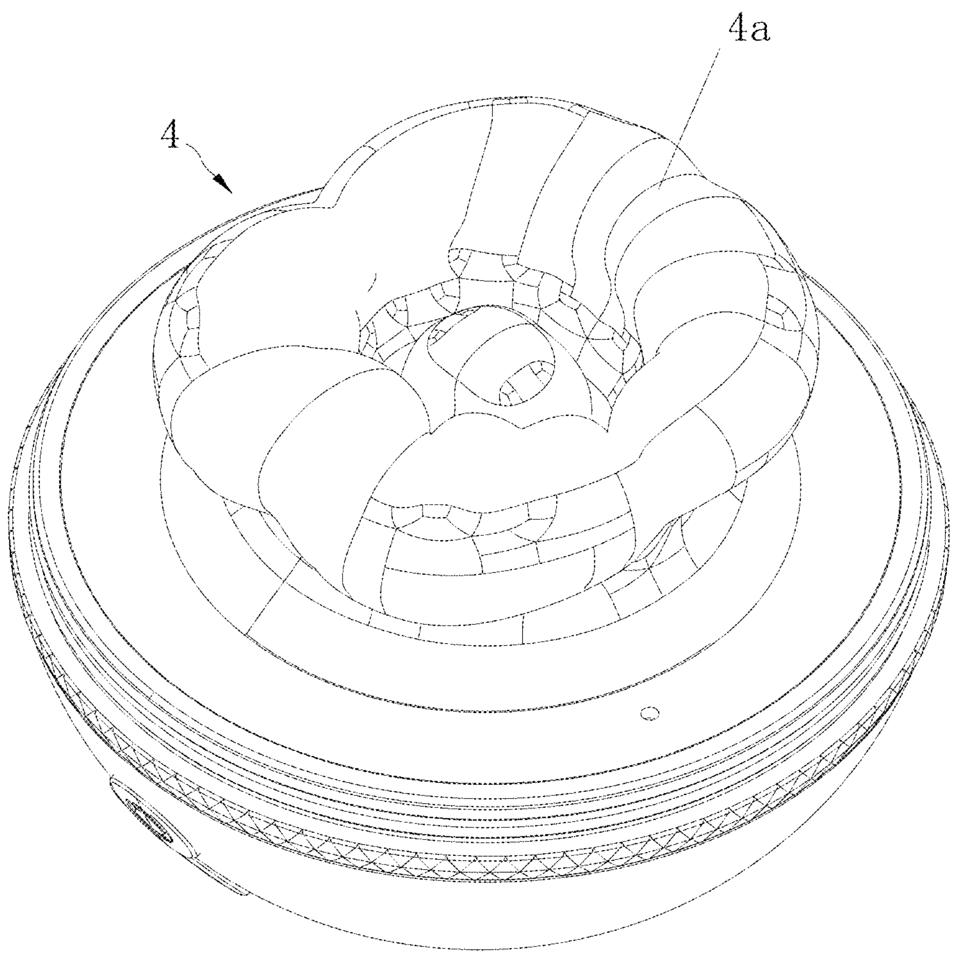
FIG. 8 is a three-dimensional schematic diagram of the present disclosure.

The technical solutions in the embodiments of the present disclosure will be clearly and completely described below with reference to the accompanying drawings. Obviously, the described embodiments are only a part of the embodiments of the present disclosure, rather than all of the embodiments. Based on the embodiments of the present disclosure, all other embodiments obtained by those of ordinary skill in the art without creative efforts fall within the scope of protection of the present disclosure.

It should be noted that if there are directional indications (such as up, down, left, right, front, back, top, bottom, inside, outside, vertical, transverse, longitudinal, counter-clockwise, clockwise, circumferential, radial, axial . . . ), this directional indication is only used to explain the relative positional relationship, movement, etc. between the components in a specific posture (as shown in the accompanying drawings). If the specific posture changes, the directional indication also changes accordingly.

In addition, if there are descriptions involving "first" or "second" etc. in the embodiments of the present disclosure, the descriptions of "first" or "second" etc. are only for descriptive purposes and cannot be understood as instructions or implying its relative importance or implicitly specifying the quantity of the technical feature indicated. Therefore, features defined as "first" and "second" may explicitly or implicitly include at least one of these features. In addition, the technical solutions in various embodiments may be combined with each other, provided that such combinations are realizable by those skilled in the art. Where the combination of technical solutions is contradictory or unfeasible, it shall be deemed that such a combination does not exist and is not within the scope of protection required by the present disclosure.

As shown in FIG. 1 to FIG. 9, a double-claw driving mechanism, comprising: a housing 1, wherein the housing 1 is provided with a horizontal guide groove 10;

a driving plate 2, wherein the driving plate 2 is arranged in the guide groove 10, a swing arm 3 is installed at each of two ends of the driving plate 2, and a lower end of the swing arm 3 is connected to the driving plate 2; and a driving device 6, wherein the driving device 6 is used for driving the driving plate 2 to reciprocate in a length direction of the guide groove 10, thereby driving the swing arm 3 to swing in a reciprocating manner, and the two swing arms 3 swing between positions close to each other and positions away from each other.

In the actual design, when the driving plate 2 moves horizontally in a reciprocating manner, the upper end of the swing arm 3 is limited by the massage head 4*a* or the amplitude of the swing shaft. As the driving plate 2 moves horizontally in a reciprocating manner, it drives the lower end of the swing arm 3 to swing, which in turn drives the massage head 4*a* to swing (i.e., reciprocate), simulating the kneading process of two fingers and thereby enhancing the stimulating effect of the massage. Furthermore, the use of a single driving device 6 achieves the relative movement of the upper ends of the two swing arms 3, making the overall volume of the massage device smaller and facilitating the application of the double-claw mechanism in adult products (such as female or male sexual products).

Specifically, an upper wall of the housing 1 is provided with an elastic skin layer 4, the elastic skin layer 4 is provided with a massage head 4*a* matched with the swing arm 3, and the massage head 4*a* is provided with a clamping hole 4*d* for the swing arm 3 to extend into.

In the actual design, the elastic skin layer 4 and the massage head 4*a* can limit the swing amplitude of the swing arm 3, thereby enabling the upper end of the swing arm 3 to swing through the reciprocating movement of the lower end of the swing arm 3.

Essentially, it can be understood that the elastic skin layer 4 acts as a constraint, allowing the swing arm 3 to use the lower end of the massage head 4*a* as the pendulum shaft end 8*a*, causing the upper end of the massage head 4*a* to swing.

By using the elastic skin layer 4 as the pendulum shaft end 8*a*, a flexible movement is achieved, making the massage stimulation at the upper end of the swing arm 3 more comfortable and gentle.

For example, when applied to adult products, this design can enhance the sensation while avoiding discomfort caused by rigid contact, thereby improving sexual stimulation.

Specifically, a pendulum shaft end 8*a* is provided at a position between the massage head 4*a* and the elastic skin layer 4. The pendulum shaft end 8*a* can be understood as the fulcrum 8*b* of the swing arm 3, thereby enabling the upper end of the swing arm 3 to swing.

Specifically, a lower end of the clamping hole 4*d* is provided with a first limiting block 4*b*, the first limiting block 4*b* and an inner wall of the clamping hole 4*d* enclose a limiting groove 4*c*, an upper end of the swing arm 3 is provide with a limiting shaft 3*a*, and an outer diameter of the limiting shaft 3*a* is larger than an inner diameter of the limiting groove 4*c*. This design allows the upper end of the swing arm 3 to snap into the elastic skin layer 4, achieving positioning.

Specifically, a middle of the swing arm 3 is provided with a fulcrum 8*b*, and the fulcrum 8*b* is matched with the elastic skin layer 4 or the housing 1. In the actual design, the housing 1 can also extend towards the fulcrum 8*b* of the swing arm 3, or the elastic skin layer 4 can extend towards the fulcrum 8*b* of the swing arm 3, thereby enabling the relative movement of the upper end of the swing arm 3.

Specifically, two sides of the driving plate 2 are provided with two sets of rotating shafts 5, the two sets of rotating shafts 5 are used for installing the two swing arms 3 respectively, and the lower end of the swing arm 3 is provided with a swing groove 51 matched with the rotating shafts 5. That is, through the cooperation of the rotating shafts 5 and the swing groove 51, the relative swing of the swing arm 3 can be realized.

Specifically, a lower end of the swing groove 51 is provided with an opening groove 52, an inner diameter of the swing groove 51 is matched with an inner diameter of the rotating shafts 5, a second limiting block 53 is arranged at one end, away from the driving plate 2, of the rotating shafts 5, and an outer diameter of the second limiting block 53 is larger than an inner diameter of the opening groove 52. The provision of the opening groove 52 facilitates the installation of the swing arm 3 and prevents rigid squeezing when resistance is encountered at the end portion of the swing arm 3, thereby making the massage stimulation more gentle.

Alternatively, the swing groove 51 can be designed as a flexible structure, allowing the two sides of the swing arm 3 to bend outward and then clamp onto the rotating shafts 5.

Specifically, the swing groove 51 is obliquely arranged relative to the swing arm 3, and the swing groove 51 extends towards a center of the driving plate 2 from top to bottom. Adopting an oblique structure can increase the swing range of the upper end of the swing arm 3, thereby enhancing the massage stimulation.

Specifically, the driving device 6 comprises a rotating motor 61, an eccentric cam 62 and a driving groove 63, the eccentric cam 62 is connected to the rotating motor 61, the driving groove 63 is provided on the driving plate 2 in a penetrating mode, and the eccentric cam 62 extends into the driving groove 63. The eccentric cam 62 and the driving groove 63 cooperate to drive the driving plate 2 to move reciprocally, which in turn drives the two swing arms 3 to move relatively.

Specifically, the driving plate 2 comprises a bottom plate 20 and an adjusting plate 21 (the adjusting plate moves relative to the bottom plate), the adjusting plate 21 is arranged above the bottom plate 20, the driving groove 63 comprises a first driving groove 63*a* and a second driving groove 63*b*, the first driving groove 63*a* is provided on the bottom plate 20, and the second driving groove 63*b* is provided on the adjusting plate 21;

the swing arm 3 comprises a first swing arm 31 and a second swing arm 32, the first swing arm 31 is arranged at one end of the bottom plate 20, and the second swing arm 32 is arranged on the adjusting plate 21 and away from a position of the first swing arm 31;

the eccentric cam 62 includes a first eccentric cam 62*a* and a second eccentric cam 62*b*, and the second eccentric cam 62*b* is provided above the first eccentric cam 62*a;* the second driving groove 63*b* is located above the first driving groove 63*a*; and the second eccentric cam 62*b* penetrates through the first driving groove 63*a* and then is matched with the second driving groove 63*b*, and the first eccentric cam 62*a* is matched with the first driving groove 63*a*.

Specifically, the bottom plate 20 and the adjusting plate 21 are matched, and then the first eccentric cam 62*a* and the second eccentric cam 62*b* connected with the rotating motor 61 are driven to rotate via one rotating motor 61 to drive the bottom plate 20 and the adjusting plate 21 to move relative to each other.

Specifically, the bottom plate 20 and the adjusting plate 21 are respectively provided with a first rotating shaft 5*a* and a second rotating shaft 5*b*. The first rotating shaft 5*a* and the second rotating shaft 5*b* are respectively located on two sides of the driving plate 2.

Specifically, the rotating motor 61 is located in a middle of the driving plate 2 or on any side of the driving plate 2. Preferably, the rotating motor 61 is located on any side of the driving plate 2, leaving the other side of the driving plate 2 clear for the installation of other devices, thus improving the utilization of space.

Figure 9:
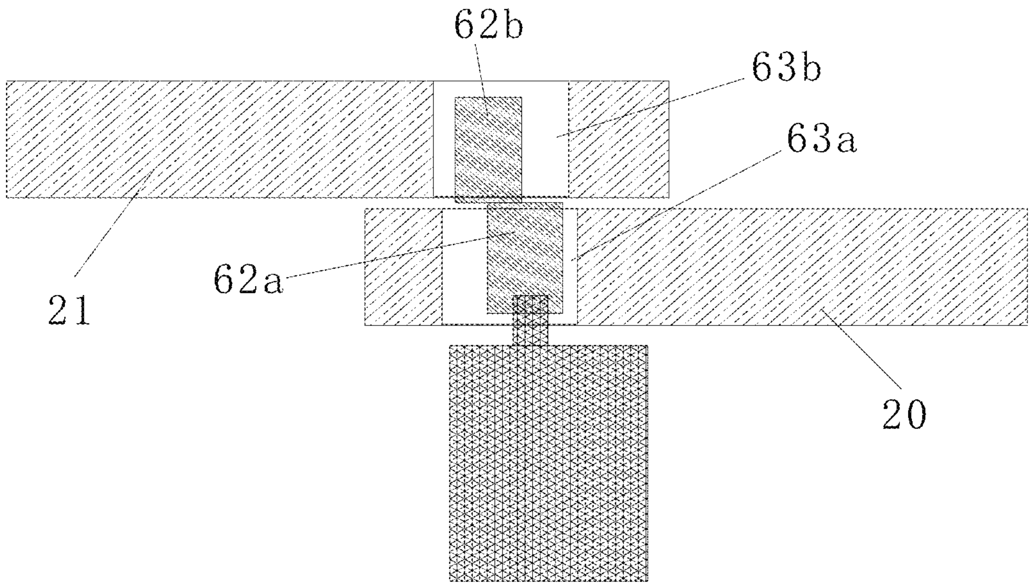
FIG. 9 is a schematic diagram when a driving groove is arranged in the middle of a driving plate.

Specifically, a length of the bottom plate 20 is greater than a length of the adjusting plate 21, or the length of the bottom plate 20 is adapted to the length of the adjusting plate 21. For example, as shown in FIG. 9, the length of the bottom plate 20 is the same as that of the adjusting plate 21, at this time, the first driving groove 63*a* is located at one end, close to the bottom plate 20, of the adjusting plate 21, and the second driving groove 63*b* is located at the end, close to the adjusting plate 21, of the bottom plate 20.

Specifically, the first eccentric cam 62*a* and the second eccentric cam 62*b* are arranged in a staggered manner.

Specifically, a convex portion of the first eccentric cam 62*a* is opposite to a convex portion of the second eccentric cam 62*b*, and sizes and shapes of the first driving groove 63*a* and the second driving groove 63*b* are the same. The first driving groove 63*a* and the second driving groove 63*b* are of the same size and shape, so that the two swing arms 3 have the same swing amplitude and frequency. The two opposite-facing convex portions on the first eccentric cam 62*a* and the second eccentric cam 62*b* enable the two swing arms 3 to move closer to and farther from each other.

Specifically, the bottom plate 20 is provided with a driving portion 20*a* which is arranged in a bent mode, an upper wall of the bottom plate 20 and one side of the driving portion 20*a* are provided with a clearance space 20*b*, the adjusting plate 21 is arranged in the clearance space 20*b*, and an upper wall of the adjusting plate 21 and an upper wall of the driving portion 20*a* are located at the same horizontal position, thereby ensuring consistent mutual swing amplitude between the two swing arms 3.

Specifically, an upper wall of the housing 1 is provided with an outer cover 7, the outer cover 7 is provided with a hole position 71 for the swing arm 3 to extend out, and the hole position 71 is used for limiting a swing amplitude of the swing arm 3.

Specifically, the driving groove 63 is strip-shaped, and a length and width of the driving groove 63 are both greater than a diameter of the eccentric cam 62.

Specifically, the elastic skin layer 4 is closed at an axis, which enhances sexual stimulation while providing a softer touch.

The above descriptions are only preferred embodiments of the present disclosure and are not intended to limit the patent scope of the present disclosure, and any equivalent structural transformation made by the description and drawings of the present disclosure or direct/indirect application in other related technical fields is included in the patent protection scope of the present disclosure under the inventive concept of the present disclosure.

What is claimed is:

1. A double-claw driving mechanism, comprising:

a housing, wherein the housing is provided with a horizontal guide groove;

a driving plate, wherein the driving plate is arranged in the guide groove, two swing arms are installed at each of two ends of the driving plate, and a lower end of the two swing arms is connected to the driving plate; and a driving device, wherein the driving device is used for driving the driving plate to reciprocate in a length direction of the guide groove, thereby driving the two swing arms to swing in a reciprocating manner, and the two swing arms to swing between positions close to each other and positions away from each other;

wherein an upper wall of the housing is provided with an elastic skin layer, the elastic skin layer is provided with a massage head cooperated with each of the two swing arms, and the massage head is provided with clamping holes for the two swing arms to extend into;

wherein a lower end of each of the clamping holes is provided with a first limiting block, the first limiting block and an inner wall of each of the clamping holes enclose a limiting groove, an upper end of each of the two swing arms is provided with a limiting shaft, and an outer diameter of each limiting shaft is larger than an inner diameter of each limiting groove;

wherein the driving device comprises a rotating motor, an eccentric cam and a driving groove, the eccentric cam is connected to the rotating motor, the driving groove is disposed through the driving plate, and the eccentric cam extends into the driving groove.

2. The double-claw driving mechanism according to claim 1, wherein a pendulum shaft end is provided at a position between the massage head and the elastic skin layer.

3. The double-claw driving mechanism according to claim 1, wherein a middle of each of the two swing arms is provided with a fulcrum, and each fulcrum is cooperated with the elastic skin layer or the housing.

4. The double-claw driving mechanism according to claim 1, wherein two sides of the driving plate are provided with one set each of rotating shafts, the two sets of rotating shafts are used for installing the two swing arms respectively, and each lower end of the two swing arm is provided with swing grooves cooperated with the rotating shafts.

5. The double-claw driving mechanism according to claim 4, wherein a lower end of each of the swing grooves is provided with an opening groove, an inner diameter of the swing grooves is cooperated with an inner diameter of the rotating shafts, a second limiting block is arranged at one end, away from the driving plate, of the rotating shafts, and an outer diameter of the second limiting block is larger than an inner diameter of the opening groove.

6. The double-claw driving mechanism according to claim 4, wherein the swing grooves are obliquely arranged relative to the two swing arms, and the swing grooves extend towards a center of the driving plate.

7. The double-claw driving mechanism according to claim 1, wherein the driving plate comprises a bottom plate and an adjusting plate, the adjusting plate is arranged above the bottom plate, and the adjusting plate is arranged to move relative to the bottom plate.

8. The double-claw driving mechanism according to claim 7, wherein the driving groove comprises a first driving groove and a second driving groove, the first driving groove is provided on the bottom plate, and the second driving groove is provided on the adjusting plate;

the two swing arms comprises a first swing arm and a second swing arm, the first swing arm is arranged at one end of the bottom plate, and the second swing arm is arranged on the adjusting plate and away from a position of the first swing arm;

the eccentric cam includes a first eccentric cam and a second eccentric cam, and the second eccentric cam is provided above the first eccentric cam;

the second driving groove is located above the first driving groove; and the second eccentric cam penetrates through the first driving groove and then is cooperated with the second driving groove, and the first eccentric cam is cooperated with the first driving groove.

9. The double-claw driving mechanism according to claim 8, wherein the bottom plate is provided with a first rotating shaft, and the adjusting plate is provided with a second rotating shaft.

10. The double-claw driving mechanism according to claim 1, wherein the rotating motor is located in a middle of the driving plate or on any side of the driving plate.

11. The double-claw driving mechanism according to claim 8, wherein a length of the bottom plate is greater than a length of the adjusting plate.

12. The double-claw driving mechanism according to claim 8, wherein the first eccentric cam and the second eccentric cam are arranged in a staggered manner.

13. The double-claw driving mechanism according to claim 8, wherein a convex portion of the first eccentric cam is opposite to a convex portion of the second eccentric cam, and sizes and shapes of the first driving groove and the second driving groove are the same.

14. The double-claw driving mechanism according to claim 8, wherein the bottom plate is provided with a bend portion, an upper wall of the bottom plate and one side of the bend portion are provided with a clearance space, the adjusting plate is arranged in the clearance space, and an upper wall of the adjusting plate and an upper wall of the bend portion are located at a same horizontal position.

15. The double-claw driving mechanism according to claim 1, wherein an upper wall of the housing is provided with an outer cover, the outer cover is provided with a hole position for the two swing arms to extend out, and the hole position is used for limiting a swing amplitude of the two swing arms.

16. The double-claw driving mechanism according to claim 1, wherein a length and width of the driving groove are both greater than a diameter of the eccentric cam.

17. The double-claw driving mechanism according to claim 1, wherein the elastic skin layer is closed at an axis.

* * * * *